United States Patent [19]

Spakowski

[11] 4,376,433
[45] Mar. 15, 1983

[54] SUPPLEMENTAL FUEL INJECTION SYSTEM

[75] Inventor: Paul A. Spakowski, Pacifica, Calif.

[73] Assignee: All American Fuel Systems, San Francisco, Calif.

[21] Appl. No.: 263,796

[22] Filed: May 22, 1981

[51] Int. Cl.³ ............................................ F02M 51/00
[52] U.S. Cl. .................................... 123/478; 123/577
[58] Field of Search .............. 123/575, 577, 478, 472, 123/470, 590, 445, 1 A

[56] References Cited

U.S. PATENT DOCUMENTS

| | | | |
|---|---|---|---|
| 3,893,434 | 7/1975 | Thatcher et al. | 123/478 |
| 4,100,896 | 7/1978 | Thatcher et al. | 123/537 |
| 4,140,088 | 2/1979 | de Vulpillieres | 123/478 |
| 4,231,333 | 11/1980 | Thatcher et al. | 123/478 |
| 4,235,205 | 11/1980 | Fukui et al. | 123/478 |

Primary Examiner—Craig R. Feinberg
Assistant Examiner—E. Rollins Cross
Attorney, Agent, or Firm—Townsend and Townsend

[57] ABSTRACT

A supplemental fuel system that renders a carburetor-based primary fuel system capable of operating on ethanol, methanol, or gasoline utilizing single point fuel injection at the induction port of the intake manifold while continuing to use the existing carburetor to meter air and typically fuel as well. The fuel injection is implemented by an injector plate that fits between the carburetor mounting flange on the intake manifold and the carburetor baseplate that carries a first idle injector, a first run injector, a second idle injector, and a second run injector, each operable to atomize alcohol fuel for incorporation into the air or air-fuel mixture flowing through the carburetor. The injectors are supplied by a valved conduit arrangement with the configuration of the valves being controlled by a three-position mode selector switch. The system operates in a selected one of three modes, selected on the basis of whether the vehicle fuel tank contains ethanol, methanol, or gasoline. In the first mode, the first idle injector is supplied with fuel while the second idle and run injectors are cut off. Depending on engine operating parameters including engine load and throttle position, an appropriate amount of fuel is supplied to the first run injector. Similarly, in the second mode, the first idle and run injectors are cut off, and fuel is supplied on a continuous basis to the second idle injector and on a demand basis to the second power injector. In the third mode, all the injectors are cut off, and fuel is supplied to the carburetor in the normal fashion. Each injector preferably comprises one or more impingement pin nozzles.

18 Claims, 3 Drawing Figures

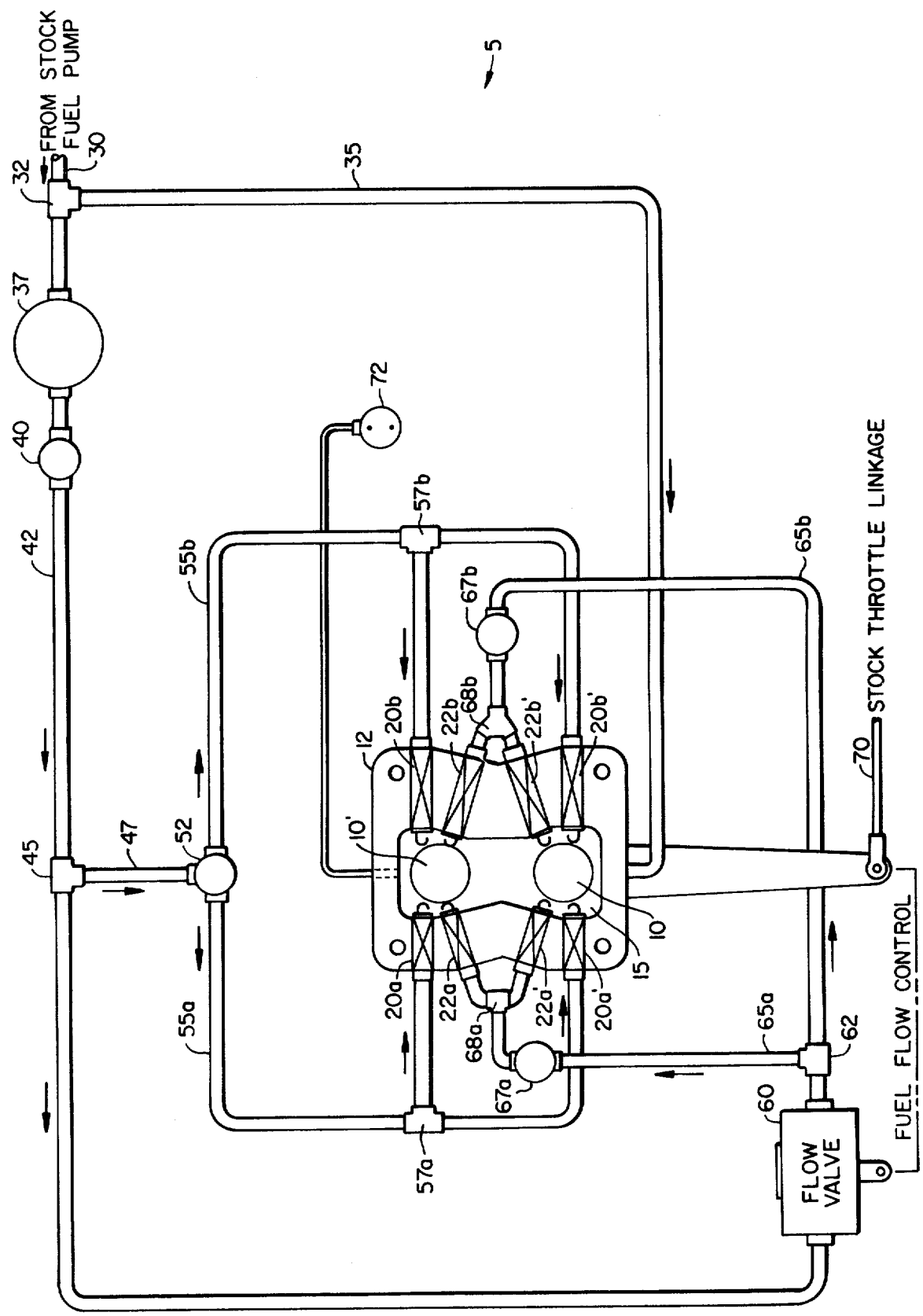

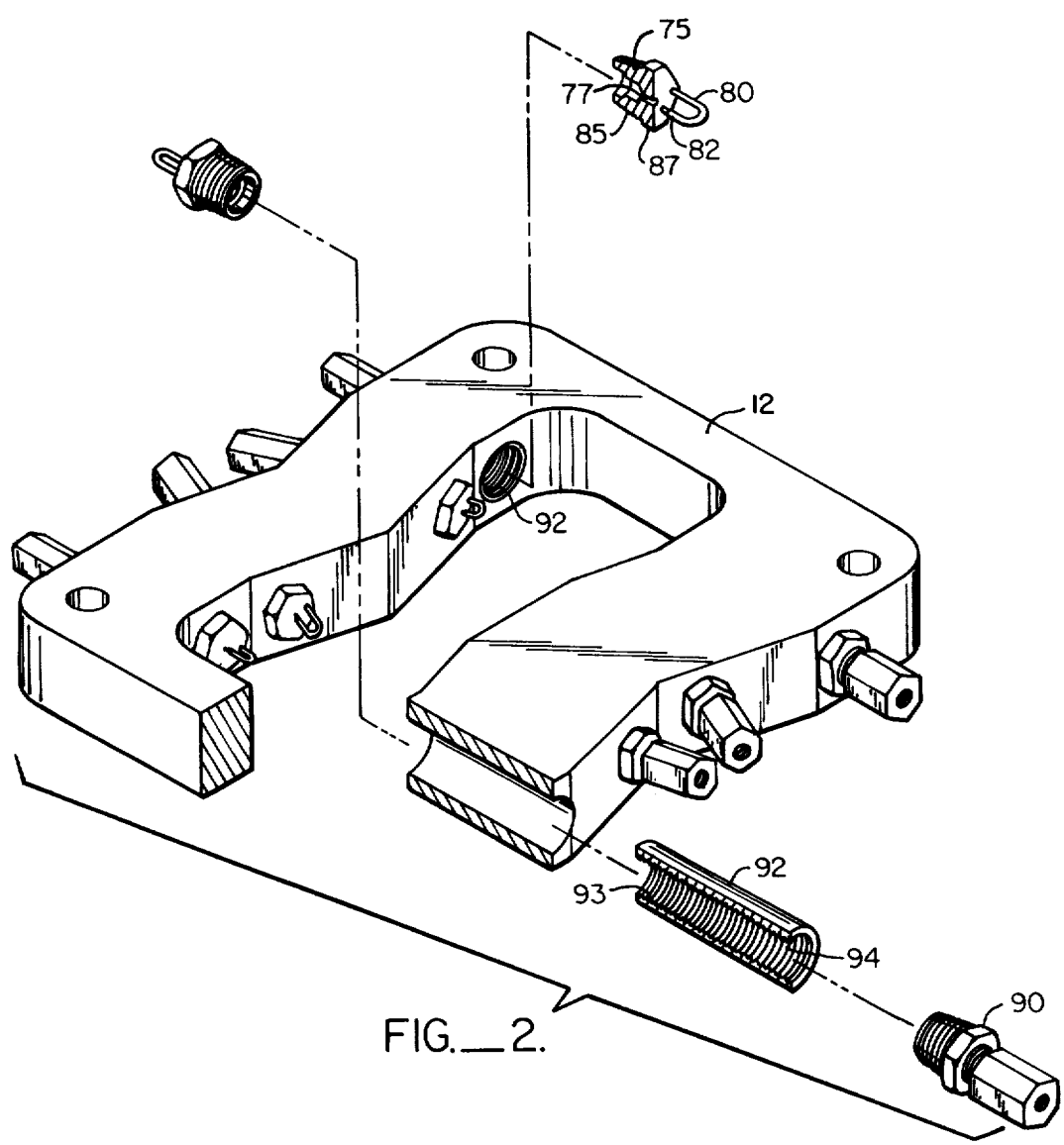
FIG._2.

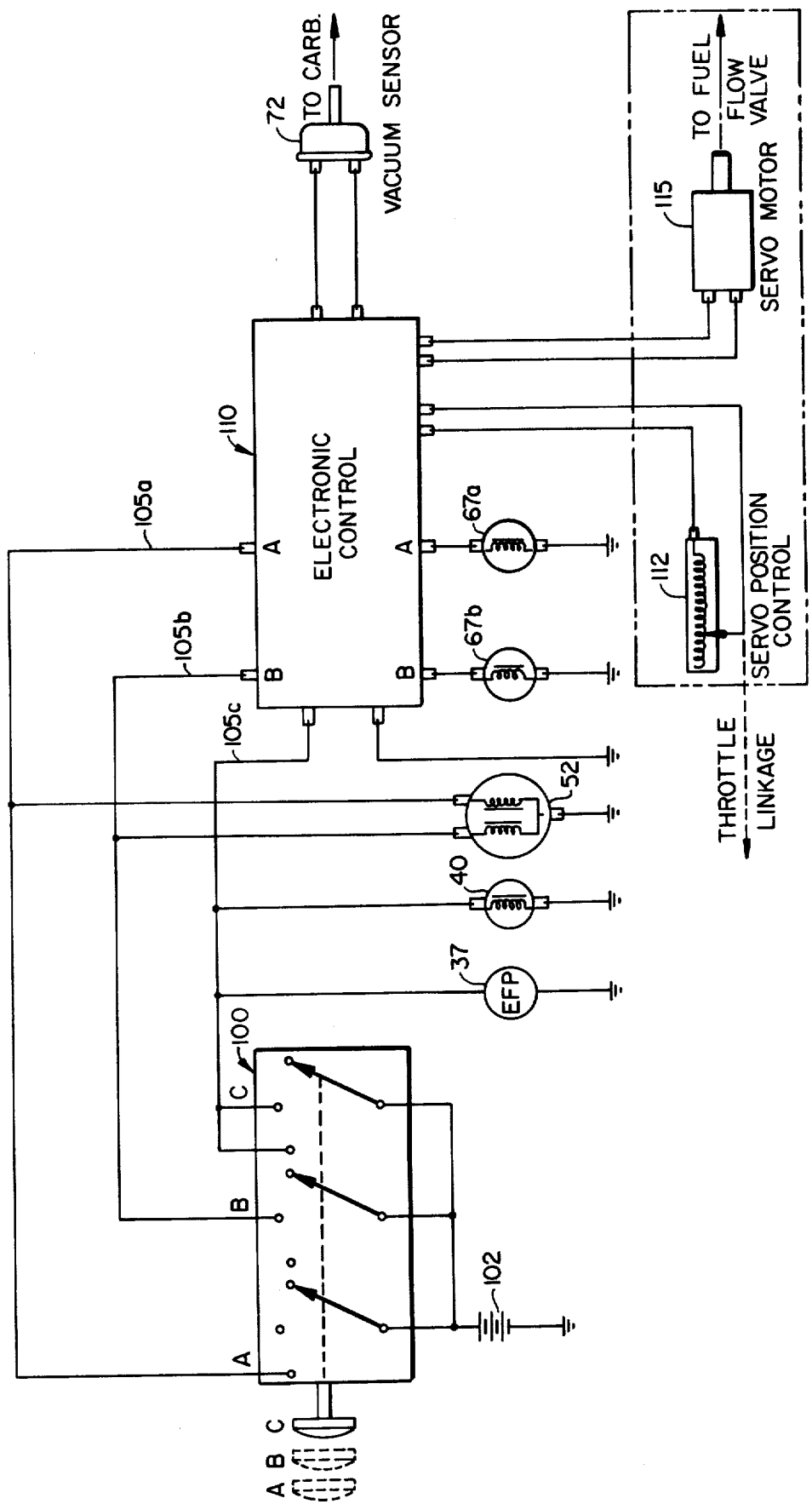
FIG._3.

4,376,433

SUPPLEMENTAL FUEL INJECTION SYSTEM

FIELD OF THE INVENTION

The present invention relates generally to internal combustion engines, and more specifically to a system for enabling an internal combustion engine to run on a selected one of a plurality of fuels.

BACKGROUND OF THE INVENTION

The use of alcohol (most notably methanol and ethanol) as an automotive fuel dates far back to those simpler days of acetylene lamps and rumble seats when automobile owners were inclined to put anything that was flammable into their fuel tank. However, while alcohol was in many ways a superior fuel to the low-grade gasoline available in the early days, automotive and petroleum refining science progressed to where gasoline became the better fuel, and the use of alcohol fuel in the United States steadily declined. Nevertheless, other countries have not always enjoyed the ready availability of gasoline, and alcohol has at various times found widespread use as a fuel. For example, during World War II, alcohol was the dominant fuel in Europe, and continues to find widespread use in Brazil and other places.

With today's increased concern about the availability of petroleum, the use of alcohol fuel has once more become a topic of pressing interest. Moreover, alcohol has certain desirable attributes that render it an intrinsically desirable fuel. For example, alcohol burns more cleanly than gasoline, the emissions from an alcohol engine being characterized by lower levels of carbon monoxide and nitrogen oxide. Also, alcohol is less explosive than gasoline, and is thus a safer fuel to use. Moreover, alcohol can be made from coal and biomass sources, and is thus, in effect, a renewable resource whereas gasoline (or any petroleum-based fuel) is non-renewable.

One should not, however, be swept away on a wave of euphoria brought about by contemplating the political, economic, and social benefits of alcohol fuel, but rather should be sobered by the recognition that alcohol fuel has its problems. For example, methanol and ethanol are characterized by a considerably lower power output per unit volume than gasoline, and are harder to vaporize than gasoline. While these problems may be overcome to some degree by using a mixture of gasoline and alcohol, commonly referred to as "gasohol," the alcohol must be high proof (190 or above) and the mixture cannot contain more than about 10% alcohol. Therefore, the use of gasohol can only reduce petroleum consumption by a relatively small proportion, and provides little in the way of cost savings.

Thus, while the use of straight alcohol as a fuel is potentially attractive, it will be appreciated that a standard automobile will either run poorly, or not at all, if the fuel tank is merely filled with alcohol, and some sort of retrofitting operation is necessary to adapt existing engines for alcohol use. This tends to be complex and expensive. For example, a generally accepted way of retrofitting a vehicle engine for alcohol use is to provide fuel injection at the cylinders. For the vast majority of engines having carburetors rather than fuel injectors, this requires a new intake manifold. At the same time, an overriding constraint on any retrofitting activity is the requirement that none of the pollution control equipment be disabled or otherwise modified.

A further problem with the use of alcohol as a fuel is its limited availability. There is no doubt that the technology exists to produce alcohol fuel that is cost competitive with gasoline, but there is little incentive to do so unless a large number of vehicles are capable of using the alcohol as fuel. At the same time, there is little incentive to configure automotive fuel systems for alcohol fuel in the absence of abundant supplies of alcohol fuel.

Accordingly, there is presented the need for a retrofit system that renders a vehicle engine capable of running on alcohol fuel. Given that alcohol fuel is not yet readily available in all places, an engine so retrofitted must still be capable of using more conventional fuels.

SUMMARY OF THE INVENTION

The present invention provides a supplemental fuel system that renders a carburetor-based primary fuel system capable of operating on alternate fuels such as ethanol and methanol, in addition to gasoline. The system is easily retrofitted to existing engines, and avoids the need for replacement of any major components.

Broadly, the present invention utilizes single point fuel injection at the induction port of the intake manifold while continuing to use the existing carburetor to meter air and typically fuel as well. In a preferred embodiment, the fuel injection is implemented by an injector plate that fits between the carburetor mounting flange on the intake manifold and the carburetor baseplate. The injector plate has a central opening at least commensurate in size with the induction port, and carries four injectors, designated first idle injector, first run injector, second idle injector, and second run injector. Each injector, which may comprise one or more nozzles, is operable to atomize alcohol fuel for incorporation into the air or air-fuel mixture flowing through the carburetor. The injectors are supplied by a valved conduit arrangement with the configuration of the valves being controlled in response to the position of a three-position mode selector switch. The system operates in a selected one of three modes, selected on the basis of whether the vehicle fuel tank contains ethanol, methanol, or gasoline. While the system operates independently of the type of fuel, the injectors are sized to provide optimum engine operation with the fuel appropriate to the selected mode.

In the first mode, with the switch in the first position, the first idle injector is supplied with fuel while the second idle and run injectors are cut off. Depending on engine operating parameters including engine load and throttle position, an appropriate amount of fuel is supplied to the first run injector. Similarly, in the second mode, the first idle and run injectors are cut off, and fuel is supplied on a continuous basis to the second idle injector and on a demand basis to the second power injector. In the third mode, all the injectors are cut off, and fuel is supplied to the carburetor in the normal fashion. Fuel may be supplied to the carburetor in the first and second modes.

The supplemental fuel system of the present invention receives fuel from the primary fuel system's fuel pump, and incorporates a high pressure supplemental fuel pump for supplying the injectors. Each injector preferably comprises one or more impingement pin nozzles. Such nozzles are surprisingly effective in atomizing the alcohol, thus allowing injection at the induction port rather than at the cylinders. Due to the excellent atomization provided by the impingement pin nozzles, an alcohol-fueled vehicle equipped with the supplemental fuel system of the present invention is able to start easily without the need for an extra "crutch" fuel, and exhibits extremely smooth idle behavior.

For a further understanding of the nature and advantages of the present invention, reference should be made to the remaining portions of the specification and the attached drawings.

BRIEF DESCRIPTION OF THE DRAWINGS

FIG. 1 is a plan schematic view of a supplemental fuel injection system according to the present invention;

FIG. 2 is a partly cut away, partly exploded isometric view of the injector plate and injector nozzles; and FIG. 3 is a schematic of the control system.

DESCRIPTION OF THE PREFERRED EMBODIMENT

FIG. 1 is a plan schematic view of a supplemental fuel injection system 5 operable to render a carburetor-based primary fuel system capable of operating on the primary fuel, or on either of two alternate fuels. The description that follows will be with respect to a system where methanol and ethanol are the first and second alternate fuels, and gasoline is the primary fuel. Also, the system illustrated and described below will be one for a two-barrel carburetor. It will, of course, be understood that the present invention is applicable to other fuels, and other carburetor configurations.

Broadly, the present invention utilizes single point fuel injection at the induction ports 10 and 10' of the engine intake manifold while continuing to use the existing carburetor (not shown) to meter air and fuel. The fuel injection is implemented by an injector plate 12 that fits between the carburetor mounting flange on the intake manifold and the carburetor base plate. Injector plate 12 has a central opening 15 that is at least as large as the area of induction ports 10 and 10' so that air-fuel flow through the carburetor is unimpeded. Injector plate 12 carries first and second methanol idle nozzles 20a and 20a', first and second methanol run nozzles 22a and 22a', first and second ethanol idle nozzles 20b and 20b', and first and second ethanol run nozzles 22b and 22b'. The nozzles are operable to atomize alcohol fuel supplied thereto at high pressure for incorporation into the air-fuel mixture flowing through the carburetor. Fuel is supplied to different combinations of the nozzles by a valved conduit arrangement, with the configuration of the valves being controlled in response to the position of a three-position mode selector switch.

The valved conduit arrangement will now be described. As will be seen, the system can be divided into an idle portion and a run portion, parts of each of which can be divided into methanol and ethanol portions. Where appropriate, valves and conduit portions will be prefixed by methanol/ethanol and idle/run designations. Fuel from the vehicle's stock fuel pump is supplied to a primary supply line 30 which branches at a T-fitting 32 to a carburetor supply line 35 and to the input of a high pressure supplemental fuel pump 37, the output of which communicates through a solenoid-actuated supplemental supply valve 40 to a supplemental supply line 42.

The flow of fuel through supplemental supply line 42 is split at a T-fitting 45, a first portion passing to an idle circuit supply line 47 and a second portion passing to a run circuit supply line 50. Fuel flowing through idle circuit supply line 47 encounters a solenoid-actuated diverter valve 52 (referred to as ethanol/methanol diverter 52) which is operable to permit fuel to flow into either a methanol idle line 55a or an ethanol idle line 55b. Methanol idle line 55a is split at a T-fitting 57a in order to supply methanol idle nozzles 20a and 20a'. Similarly, ethanol line 55b is split at a T-fitting 57b in order to supply ethanol idle nozzles 20b and 20b'.

The flow through run circuit supply line 50 is controlled by a proportioning valve 60, the controlled output flow from which is split at a T-fitting 62. A first portion flows into a methanol run line 65a and second portion into an ethanol run line 65b. The flow through methanol run line 65a is controlled by a solenoid-actuated methanol run valve 67a, the output of which communicates through a T-fitting 68a to methanol run nozzles 22a and 22a'. In a similar manner, a solenoid-actuated ethanol run valve 67b controls the flow through ethanol run line 65b. The flow past ethanol run valve 67b is split at a T-fitting 68b and is supplied to ethanol run nozzles 22b and 22b'.

The position of proportioning valve 60 is controlled by engine operating parameters such as the position of throttle linkage 70. The manner of correlating the valve setting will be described below in connection with the electrical control system. A vacuum sensor 72 is available for supplying an electrical signal representative of engine load.

FIG. 2 is a partly cut away, partly exploded isometric view of injector plate 12 and several of the nozzles. The main functional constraint on the adaptor plate configuration is that central aperture 15 be large enough so that air-fuel flow through the carburetor into induction ports 10 and 10' is not impeded. The outside configuration of the injector plate is typically matched to the outside configuration of the carburetor base plate. The thickness of the injector plate is determined by the requirement that the plate be thick enough to carry the appropriate pipe fittings and nozzle fittings, and that it not be so thick as to raise the carburetor to the point where the hood of the vehicle will not close. Where possible, a 1-inch plate is used, but where hood clearance does not permit, a ½-inch thick plate is used. Injector plate 12 may be fabricated from machined aluminum.

An important feature of the present invention relies on the use of impingement pin nozzles which are capable of atomizing alcohol at a pressure of about 35 psi which is much lower than the 200 psi commonly seen in fuel injection systems. Suitable impingment pin nozzles are available from Bete Fog Nozzle Incorporated, Greenfield, Mass. Each such nozzle comprises a generally cylindrical body 75 having a central axial orifice 77. A J-shaped impingement pin 80 is mounted to the body and includes an end portion 82 that is axially aligned with orifice 77 and terminates in facing relation thereto. Body 75 is formed with tapered pipe threads 85 and carries a hexagonal flange 87 in the manner of standard pipe fittings.

The particular nozzle orifice diameters depend on the engine configuration, and to some extent on the other system parameters such as fuel pump output pressure. The values set forth in Table 1 below are for a 1979 Chevrolet Caprice having a 305 cubic inch displacement V-8 engine, and for a 1979 Datsun B-210 having a 1.4 liter displacement 4-cylinder engine. The Chevrolet requires two of each nozzle (as in FIG. 1) while the Datsun requires only one of each.

TABLE 1

| | Nozzle Orifice Diameters | |
|---|---|---|
| | Chevrolet | Datsun |
| methanol idle | 0.008" (PJ-8) | 0.008" (PJ-8) |
| methanol run | 0.020" (PJ-20) | 0.015" (PJ-15) |
| ethanol idle | 0.008" (PJ-8) | 0.008" (PJ-8) |
| ethanol run | 0.012" (PJ-12) | 0.012" (PJ-12) |

Each nozzle is mounted to the inside of injector plate 12 while corresponding pipe fittings 90 are mounted to the outside. In order to facilitate fabrication, each nozzle and its corresponding pipe fitting are carried by a sleeve 92 having tapered pipe threads on its interior. The sleeve is provided with opposed pipe thread regions 93 and 94, and is then press fitted into plate 12. This is simpler than tapping plate 12 directly.

Generally, two types of tubing materials are used for the various conduits described above. Supplemental supply line 42, idle circuit supply line 47, and run circuit supply line 50 are fabricated from standard 5/16-inch fuel line material while the portions of the idle circuit downstream of ethanol/methanol diverter 52 and the portions of run circuit downstream of proportioning valve 60 are formed from copper tubing. Where a ½-inch plate is used, 1/16-inch tubing and pipe fittings are used while where a 1-inch plate is used, ⅛-inch tubing and pipe fittings are used.

There is nothing especially significant about the specific choice of solenoid-actuated valves other than that they have the functions stated above. Skinner 12 volt DC solenoid valves, being operable on the vehicle battery, are entirely suitable. Proportioning valve 60 may be a barrel valve such a those used in competition fuel injection systems and manufactured by Crower Mfg., Chula Vista, Calif. As stated above, the use of impingement pin nozzles allows excellent alcohol atomization at relatively low pressure, although considerably higher than the 5-7 psi that is available from the stock fuel pump. Accordingly, supplemental fuel pump 37 may be a Holley 12 volt high pressure fuel pump, Model Number GTH-110 which is capable of supplying fuel at an output pressure of approximately 35 psi.

FIG. 3 is a schematic of a control system for configuring the valved conduit arrangement of FIG. 1 according to the position of a three-position switch 100, shown in a third (bypass) position, designated "C", but also capable of assuming either of two other (active) positions shown in phantom, designated "A" and "B". Switch 100 may be a three-pole three-throw switch having its contacts wired to communicate power from battery 102 selectively to three output lines 105a, 105b, and 105c as follows. In position A, lines 105a and 105c are energized; in position B lines 105b and 105c are energized; and in position C, none of lines 105a-c are energized. Fuel pump 37 and the solenoid for valve 40 is coupled to line 105c; the solenoids for diverter 52 are coupled to lines 105a and 105b.

Lines 105a, 105b, and 105c are communicated to an electronic control unit 110 which also receives inputs from vacuum sensor 72 and a potentiometer 112 coupled to throttle linkage 70. Electronic control unit 110 has output terminals for energizing a servo motor 115 that controls the setting of proportioning valve 60, and output terminals for controllably energizing the solenoids for methanol run valve 67a and ethanol run valve 67b. Electronic control unit 110 is operative to couple lines 105a and 105b to the solenoids for methanol and ethanol run valve 67a and 67b when sensor 72 indicates a condition of engine load.

In view of the above description, the operation of the system 5 may be understood. Consider first the situation with the handle of switch 100 in the "A" position. Electrical power from battery 102 is communicated to lines 105a and 105c, thus causing supplemental fuel pump 37 to be energized, valve 40 to be opened, diverter 52 to be energized in the position of supplying methanol idle line 55a and blocking ethanol idle line 55b, ethanol run valve 67b to be closed, and methanol run valve 67a to be controlled as follows. At idle, fuel is thus supplied to methanol idle nozzles 20a and 20a' and is prevented from being supplied to ethanol idle nozzles 20b and 20b' and ethanol run nozzles 22b and 22b'. At idle, the throttle linkage, as communicated to electronic control unit 110 causes flow valve 60 to be at its maximally restrictive position. Additionally, at idle, the unloaded condition at the engine is communicated via vacuum sensor 72 so that electronic control unit 110 prevents energization of the solenoid for methanol run valve 67a. Thus, at idle, no fuel is supplied to methanol run nozzles 22a and 22a'. However, when the engine is off idle, methanol run valve 67a is opened so that fuel may be supplied on a demand basis to methanol run nozzles 22a and 22a'.

A corresponding situation occurs with handle of switch 100 being in the "B" position, that is, the methanol idle and run nozzles are cut off, and fuel is supplied on a continuous basis to ethanol idle nozzles 20b and 20b' and on a demand basis to ethanol run nozzles 22b and 22b'.

With the handle of switch 100 in the "C" position, electronic fuel pump 37 is not energized, and valve 40 is closed. Also, run valves 67a and 67b are closed, and flow valve 60 is typically kept in its maximally restrictive position. Thus, in this third position, the entire supplemental fuel injection system is bypassed and the normal carburetor operation occurs.

In view of the operation described above, the rationale for certain of the features may be better understood. One such feature is the fact that the selection in the idle circuit is by means of diverter 52 while selection in the run circuit is by means of separate valves 67a and 67b. While the use of a diverter in the run circuit would be preferable from a cost standpoint, the use of separate valves is dictated by the need for fast response as the engine is moved off idle. More particularly, during idle, the lines downstream of run valves 67a and 67b tend to get bled by the engine vacuum. Thus, it is desirable that the valves be physically close to the run nozzles with fully charged lines upstream to minimize the response time. Since the idle circuit is supplying fuel at all times, such considerations do not apply to the idle circuit.

In summary it can be seen that the present invention supplies a surprisingly simple and effective system for retrofitting a carburetor-based fuel system to enable it to run on either of two alternate fuels, as well as the primary fuel. While the above provides a full and complete disclosure of the preferred embodiment of this invention, various modifications, alternate constructions, and equivalents may be employed without departing from the true spirit and scope of the invention. As already stated, the configuration (choice of nozzle orifice diameters) for methanol and ethanol is merely illustrative, and other alternate fuels, such as butyl alcohol, could be used. Also, while the positioning of proportioning valve 60 is shown to be responsive to the position of the throttle linkage, it is possible to utilize other engine operating parameters to control the position. For example, engine temperature, revolutions, and possibly exhaust characteristics could be utilized in a feedback system. This would typically require a microcomputerized control unit such as that normally used in modern fuel injection systems. Indeed, the information can also be used to automatically select the mode. Moreover, while fuel is supplied to the carburetor in all three modes, the system could be easily modified by the provision of an additional solenoid actuated valve (normally open) in carburetor supply line 35 which would be closed in either the methanol or ethanol modes, thus utilizing the carburetor for metering air but relying entirely on the injection for fuel metering. Therefore, the above description and illustration should not be construed as limiting the scope of the invention which is defined by the appended claims.

I claim:

1. A supplemental fuel injection system for use in conjunction with a fuel system including a carburetor, an intake manifold, and primary fuel supply means for providing liquid fuel to said carburetor at positive pressure, comprising:
   first injector means operable to receive liquid fuel and atomize said received liquid fuel into the air flowing from said carburetor;
   second injector means operable to receive liquid fuel and atomize said received liquid fuel into the air flowing from said carburetor, said first and second injector means each including an impingement pin nozzle;
   means for supporting portions of said first and second injector means proximate the induction port of said intake manifold;
   mode selection means having first, second and third positions; and
   supplemental fuel supply means responsive to said mode selection means operable to provide liquid fuel at a pressure substantially above said positive pressure to said first injector means when said mode selection means is in said first position, and to said second injector means when said mode selection means is in said second position, and further operable to prevent liquid fuel from reaching either of said first and second injector means when said mode selection means is in said third position.

2. The invention of claim 1 wherein said means for supporting comprises a plate interposed between said carburetor and said intake manifold and having a central aperture to permit unimpeded air flow from said carburetor into said intake manifold.

3. The invention of claim 1 wherein said supplemental fuel supply means comprises:
   a high pressure supplemental fuel pump;
   valved conduit means for communicating the output of said supplemental fuel pump to said first and second injector means; and
   control means responsive to said mode selection means for configuring said valved conduit means according to the position of said mode selection means.

4. The invention of claim 1 or 3 wherein said first injector means includes idle injector means and run injector means, and wherein said supplemental fuel supply means is operable, when said mode selection means is in said first position, to supply fuel to said idle injector means on a continuous basis and to said run injector means at a flow rate dependent on engine operating conditions.

5. The invention of claim 4 wherein said supplemental fuel supply means includes a flow valve for controllably restricting the flow of liquid to said run injector means.

6. The invention of claim 1 wherein said primary fuel supply means is operable to provide fuel to said carburetor regardless of the position of said mode selection means.

7. A supplemental fuel injection system for use in conjunction with a fuel system having a carburetor, an intake manifold, and primary fuel supply means for providing fuel to said carburetor, comprising:
   a plate having a central opening generally commensurate in size with the induction port at said intake manifold, said plate having opposed faces for interposition between said carburetor and said intake manifold;
   first idle injector means carried by said plate and operable to introduce atomized fuel proximate said induction port;
   first run injector means carried by said plate and operable to introduce atomized fuel proximate said induction port;
   second idle injector means carried by said plate and operable to introduce atomized fuel proximate said induction port;
   second run injector means carried by said plate and operable to introduce atomized fuel proximate said induction port;
   mode selection means having first, second, and third positions;
   valved conduit means adapted to communicate fuel to said first and second idle injector means and said first and second run injector means;
   control means responsive to the position of said mode selection means for configuring said valved conduit means such that
      in said first position, fuel is communicated to said first idle injector means and is prevented from reaching said second idle injector means and said second run injector means,
      in said second position, fuel is communicated to said second idle injector means and is prevented from reaching said first idle injector means and said first run injector means, and
      in said third position, fuel is prevented from reaching either of said first and second idle injector means and said first and second run injector means; and
   metering means responsive to at least one operating parameter of the engine utilizing said fuel system for allowing a controlled flow of fuel to said first run injector means when said mode selection means is in said first position and to said second run injector means when said mode selection means is in said second position.

8. The invention of claim 7 wherein said operating parameter is the position of the throttle.

9. The invention of claim 7 and further comprising supplemental fuel pump means fluidly coupled to said primary fuel supply means for providing fuel to said valved conduit means at a pressure above that at which said fuel supply means provides fuel to said carburetor.

10. The invention of claim 7 or 9 wherein each of said first and second idle injector means and said first and second run injector means comprises at least one impingement pin nozzle.

11. A supplemental fuel injection system for use in conjunction with a fuel system including a carburetor, an intake manifold, and primary fuel supply means for providing liquid fuel to said carburetor at positive pressure, comprising:
   an impingement pin nozzle;
   means for supporting said impingement pin nozzle proximate the induction port of said intake manifold; and
   means for supplying fuel to said impingement pin nozzle whereupon said fuel is atomized into the air flowing from said carburetor;
   whereby said said supplemental fuel injection system renders an engine supplied from said intake manifold capable of operation on straight alcohol fuel.

12. The invention of claim 11 wherein said means for supporting comprises a plate interposed between said carburetor and said intake manifold and having a central aperture permitting unimpeded air flow from said carburetor into said intake manifold.

13. A fuel injection system for use in conjunction with a fuel system including a carburetor and an intake manifold, comprising:
   idle injector means operable to receive liquid fuel and atomize said received liquid fuel into the air flowing from said carburetor;
   run injector means operable to receive liquid fuel and atomize said received liquid fuel into the air flowing from said carburetor, said idle and run injector means including idle and run impingement pin nozzles;
   means for supporting said idle and run impingement pin nozzles proximate the induction port of said intake manifold; and
   fuel supply means operable to provide pressurized liquid fuel to said idle injector means on a continuous basis and to said run injector means on a demand basis, said fuel supply means including a fuel pump means for pressurizing the fuel to a chosen pressure.

14. A supplemental fuel injection system for use in conjunction with a fuel system having a carburetor, an intake manifold, and primary fuel supply means for providing fuel to said carburetor, comprising:
   a plate having a central opening generally commensurate in size with the induction port at said intake manifold, said plate having opposed faces for interposition between said carburetor and said intake manifold;
   an idle injector means carried by said plate and operable to introduce atomized fuel proximate said induction port;
   a run injector means carried by said plate and operable to introduce atomized fuel proximate said induction port;
   mode selection means having first and second positions;
   valved conduit means adapted to communicate fuel to said idle injector means and said run injector means;
   control means responsive to the position of said mode selection means for configuring said valved conduit means such that:
     in said first position, fuel is communicated to said idle injector means, and
     in said second position, fuel is prevented from reaching said idle injector means and said run injector means; and
   metering means responsive to at least one operating parameter of the engine utilizing said fuel system for allowing a controlled flow of fuel to said run injector means when said mode selection means is in said first position.

15. A supplemental fuel injection system for use in conjunction with a fuel system having a carburetor and an intake manifold, comprising:
   a plate having a central opening generally commensurate in size with the induction port at said intake manifold, said plate having opposed faces for interposition between said carburetor and said intake manifold;
   an idle injector means carried by said plate and operable to introduce atomized fuel proximate said induction port;
   a run injector means carried by said plate and operable to introduce atomized fuel proximate said induction port;
   mode selection means having first and second positions;
   valved conduit means adapted to communicate fuel to said idle injector means and said run injector means;
   control means responsive to the position of said mode selection means for configuring said valved conduit means such that:
     in said first position, fuel is communicated to said idle injector means, and
     in said second position, fuel is prevented from reaching said idle injector means and said run injector means; and
   metering means responsive to at least one operating parameter of the engine utilizing said fuel system for allowing a controlled flow of fuel to said run injector means when said mode selection means is in said first position.

16. A supplemental fuel injection system for use in conjunction with a fuel system having a carburetor and an intake manifold, comprising:
   a plate having a central opening generally commensurate in size with the induction port at said intake manifold, said plate having opposed faces for interposition between said carburetor and said intake manifold;
   first idle injector means carried by said plate and operable to introduce atomized fuel proximate said induction port;
   first run injector means carried by said plate and operable to introduce atomized fuel proximate said induction port;
   said idle injector means carried by said plate and operable to introduce atomized fuel proximate said induction port;
   second run injector means carried by said plate and operable to introduce atomized fuel proximate said induction port;
   mode selection means having first and second positions;
   valved conduit means adapted to communicate fuel to said first and second idle injector means and said first and second run injector means;
   control means responsive to the position of said mode selection means for configuring said valved conduit means such that:

in said first position, fuel is communicated to said first idle injector means and is prevented from reaching said second idle injector means and said second run injector means, and in said second position, fuel is communicated to said second idle injector means and is prevented from reaching said first idle injector means and said first run injector means; and metering means responsive to at least one operating parameter of the engine utilizing said fuel system for allowing a controlled flow of fuel to said first run injector means when said mode selection means is in said first position and to said second run injector means when said mode selection means is in said second position.

17. The fuel injection system of claim 13 wherein said chosen pressure is substantially greater than 7 psi and is substantially less than 200 psi.

18. The fuel injection system of claim 13 wherein said chosen pressure is about 35 psi.

* * * * *